United States Patent
Saigusa et al.

(10) Patent No.: US 8,975,553 B2
(45) Date of Patent: Mar. 10, 2015

(54) WORKPIECE MOUNTING TABLE FOR ELECTRIC DISCHARGE MACHINE

(75) Inventors: Yoshinori Saigusa, Chiyoda-ku (JP); Hisashi Hara, Chiyoda-ku (JP); Hideaki Kikuchi, Chiyoda-ku (JP); Makoto Komori, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/238,655

(22) PCT Filed: Oct. 14, 2011

(86) PCT No.: PCT/JP2011/073683
§ 371 (c)(1),
(2), (4) Date: Feb. 12, 2014

(87) PCT Pub. No.: WO2013/054444
PCT Pub. Date: Apr. 18, 2013

(65) Prior Publication Data
US 2014/0197137 A1    Jul. 17, 2014

(51) Int. Cl.
*B23H 11/00* (2006.01)
*B23H 1/00* (2006.01)

(52) U.S. Cl.
CPC ............... *B23H 11/003* (2013.01); *B23H 1/00* (2013.01)
USPC ..................................... 219/69.11; 219/69.12

(58) Field of Classification Search
CPC ......... B23H 1/00; B23H 11/003; B23Q 1/032
USPC .................. 219/69.11, 69.12; 204/224 M
See application file for complete search history.

(56) References Cited

U.S. PATENT DOCUMENTS

| | | | | |
|---|---|---|---|---|
| 4,757,178 A | * | 7/1988 | Iwasaki et al. | 219/69.1 |
| 4,900,888 A | * | 2/1990 | Lee | 219/69.11 |
| 5,095,635 A | * | 3/1992 | Iwasaki | 33/644 |
| 5,428,199 A | * | 6/1995 | Berger et al. | 219/69.11 |
| 6,433,295 B1 | | 8/2002 | Yasuda | |

(Continued)

FOREIGN PATENT DOCUMENTS

| | | |
|---|---|---|
| JP | 58-094923 A | 6/1983 |
| JP | 61-257720 A | 11/1986 |
| JP | 63-185530 A | 8/1988 |

(Continued)

OTHER PUBLICATIONS

International Search Report of PCT/JP2011/073683 dated Jan. 17, 2012.

*Primary Examiner* — Geoffrey S Evans
(74) *Attorney, Agent, or Firm* — Sughrue Mion, PLLC

(57) ABSTRACT

A workpiece mounting table (20) for an electric discharge machine, which machines a workpiece (12) by discharging electricity between an electrode and the workpiece (12) in an interior of a work tank (6) and removing a surface of the workpiece (12), includes a surface-plate mounting table (3) made of a conductive material and arranged at the bottom of the work tank (6), a plurality of insulating materials (2), each of which has a flat shape and is arranged and fixed on the surface-plate mounting table (3) with a gap (4) between the insulating materials (2) to constitute an insulating flat plate (30), and a surface plate (1) made of a metal material, fixed on the insulating flat plate (30) and insulated from the surface-plate mounting table (3) by the insulating flat plate (30), for fixing thereon the workpiece (12).

11 Claims, 4 Drawing Sheets

(56) References Cited

U.S. PATENT DOCUMENTS

2007/0210500 A1* 9/2007 Troxler .................. 269/71
2009/0277876 A1   11/2009 Kawarai et al.

FOREIGN PATENT DOCUMENTS

| JP | 63-200920 A | | 8/1988 |
|---|---|---|---|
| JP | 1-183323 A | * | 7/1989 |
| JP | 02-116420 A | | 5/1990 |
| JP | 04-030911 A | | 2/1992 |
| JP | 04-360716 A | | 12/1992 |
| JP | 11-347759 A | * | 12/1999 |
| JP | 2004-291206 A | * | 10/2004 |
| JP | 2007-50506 A | * | 3/2007 |
| WO | 00/54919 A1 | | 9/2000 |
| WO | 2008/047420 A1 | | 4/2008 |

\* cited by examiner

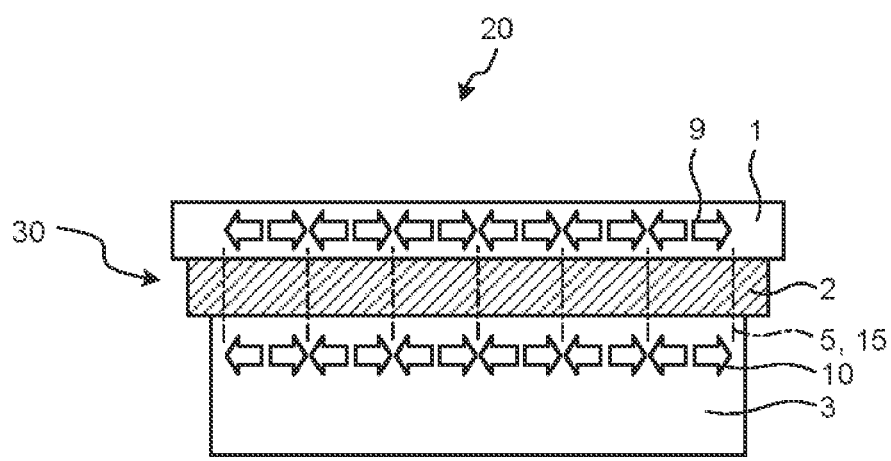
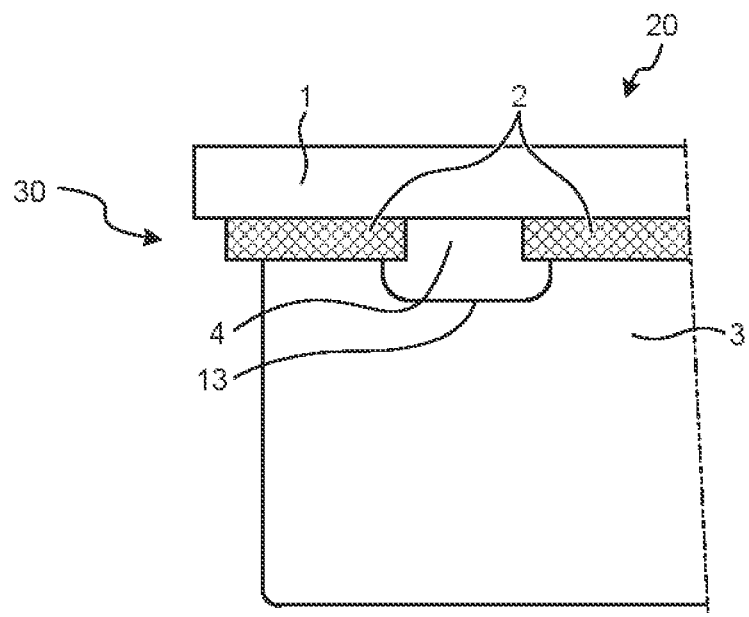

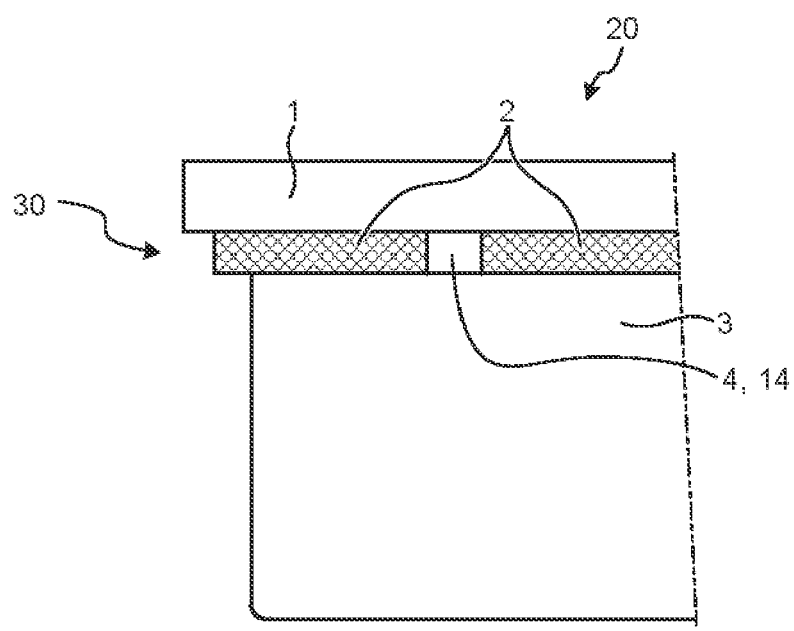

WORKPIECE MOUNTING TABLE FOR ELECTRIC DISCHARGE MACHINE

CROSS REFERENCE TO RELATED APPLICATIONS

This is a National Stage of International Application No. PCT/JP2011/073683 filed Oct. 14, 2011, the contents of which are incorporated herein by reference in its entirety.

FIELD

The present invention relates to a workpiece mounting table for an electric discharge machine.

BACKGROUND

For example, as described in Patent Literature 1, there is a conventional method of insulating a surface plate of a wire-cutting electric discharge machine in which legs of the surface plate fixing thereon a workpiece are formed of blocks with insulating properties so as to ensure insulation of the surface plate itself. Furthermore, there is another insulation method as described in Patent Literature 2, in which a surface-plate mounting table formed of a casting is provided below a surface plate and an insulation bushing is provided below the surface-plate mounting table, so as to insulate a workpiece mounting table itself that is constituted by the surface plate and the surface-plate mounting table.

Further, upon mounting a workpiece on a surface plate, the workpiece is required to be machined with micron accuracy, and therefore a surface of the surface plate is also required to have high accuracy. Accordingly, after the shipment of a machine, it is also required that the accuracy of the surface of the surface plate does not change with a large temperature increase and decrease within a transport container that transports the machine. For example, there is a case where a surface-plate mounting table that is a casting (a linear expansion coefficient 12), and a surface plate of stainless steel (a linear expansion coefficient 17) are insulated from each other by using ceramics (a linear expansion coefficient 7). In this case, a bimetal effect that is produced between materials with different linear expansion coefficients causes a problem of degrading the accuracy of a surface of the surface plate due to a temperature change during transport.

Normally, a surface plate is divided in such a manner as to suppress the bimetal effect (see Patent Literature 3).

CITATION LIST

Patent Literatures

Patent Literature 1: Japanese Patent Application Laid-open No. S63-185530
Patent Literature 2: International Publication No. WO00/54919
Patent Literature 3: Japanese Patent Application Laid-open No. H4-360716

SUMMARY

Technical Problem

In the method of Patent Literature 1 mentioned above, a block-shaped insulating material supports a heavy-weight workpiece, and therefore it is required to be rigid. Accordingly, the size of the insulating material becomes large and it causes a problem of increasing the manufacturing cost.

Furthermore, in the insulation method described in Patent Literature 2, the insulation bushing is provided below the surface-plate mounting table. Therefore, there is a problem such that machining chips accumulate around the bushing during an immersion process and it causes an insulation breakdown.

In a case where a surface plate is divided as described in Patent Literature 3, there is another problem such that conditions such as a machining current may slightly vary according to the mounting position of a workpiece.

Furthermore, when an insulating material is assembled below an integrated surface plate that is not divided, the bimetal effect due to a temperature change during transport generates a shearing force to a bolt fixing the surface plate on a plane between the surface plate and the insulating material. When this shearing force exceeds a friction force that is generated between the surface plate and the insulating material by a fastening force of the bolt fixing the surface plate, a deformation occurs. The deformation involves sliding of the surface plate and the insulating material on their contact surface. This phenomenon also occurs between an insulating plate and the surface-plate mounting table, and such a deformation due to a temperature change can involve hysteresis according to the circumstances. Therefore, there is a problem such that even when the temperature returns to the initial temperature, the accuracy of the surface plate remains at the reduced level.

As described above, conventional machines employ the structures mentioned above, and therefore have problems such that the manufacturing cost of the insulating material is high, the insulating structure is less reliable, and the accuracy of the surface plate remains at the reduced level after a deformation involving hysteresis caused by the bimetal effect due to a temperature change.

The present invention has been achieved to solve the above problems, and an object of the present invention is to provide a workpiece mounting table for an electric discharge machine, which has an inexpensive surface-plate insulating structure and prevents reduction in accuracy of a surface plate due to an influence of a temperature change during transport.

Solution to Problem

The present invention is directed to a workpiece mounting table for an electric discharge machine that achieves the object. The electric discharge machine machines a workpiece by discharging electricity between an electrode and the workpiece in an interior of a work tank and removing a surface of the workpiece. The workpiece mounting table includes a surface-plate mounting table, made of a conductive material, arranged at a bottom of the work tank; a plurality of insulating materials, each of which has a flat shape and is arranged and fixed on the surface-plate mounting table with a gap between the insulating materials to constitute an insulating flat plate; and a surface plate, made of a metal material, fixed on the insulating flat plate and insulated from the surface-plate mounting table by the insulating flat plate, for fixing thereon the workpiece.

Advantageous Effects of Invention

The workpiece mounting table for an electric discharge machine according to the present invention can prevent reduction in accuracy of a surface plate due to an influence of a temperature change, and can insulate the surface plate in a stable manner.

BRIEF DESCRIPTION OF DRAWINGS

FIG. 5 schematically depicts shearing direction stresses that are respectively generated between the surface plate and the insulating material and between the insulating material and the surface-plate mounting table due to a temperature change when the spacing of bolts fixing the surface plate and the spacing of bolts fixing the insulating materials are decreased.

FIG. 6 is a partial side view of a workpiece mounting table that includes a surface-plate mounting table in which a discharging part is provided in a portion corresponding to a gap on an insulating flat plate.

FIG. 7 is a partial side view of the workpiece mounting table in which the gap on the insulating flat plate is sealed with an insulation material.

DESCRIPTION OF EMBODIMENTS

Exemplary embodiments of a workpiece mounting table according to the present invention will be explained below in detail with reference to the accompanying drawings. The present invention is not limited to the embodiments.

Embodiment

Figure 1:
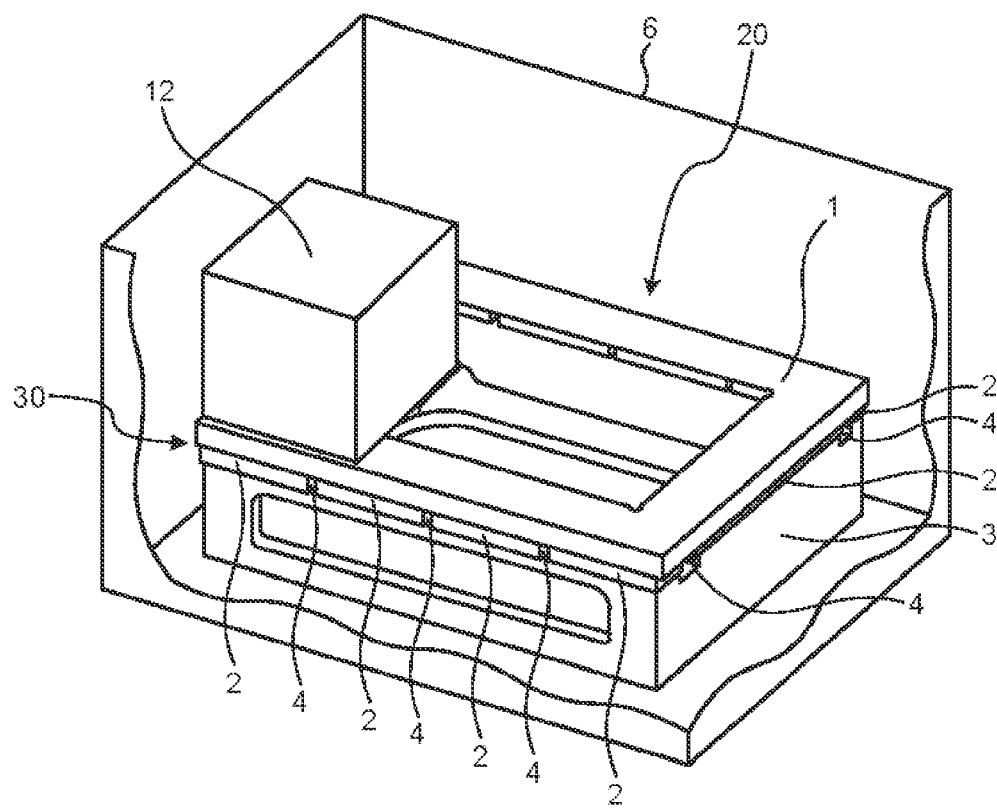
FIG. 1 depicts a configuration of a workpiece mounting table for an electric discharge machining device according to an embodiment of the present invention.

FIG. 1 depicts a configuration of a workpiece mounting table for an electric discharge machine according to an embodiment of the present invention. In FIG. 1, a part of a work tank 6 is cut out to show the interior of the work tank 6. A workpiece mounting table 20 is provided at the bottom of the work tank 6. In the workpiece mounting table 20, a plurality of flat insulating materials 2 are fixed with a constant gap 4 (the gap 4 being created between adjacent insulating materials 2) on a surface-plate mounting table 3 formed of a casting. The entirety of the insulating materials 2 forms an insulating flat plate 30 that is divided by a predetermined length. The insulating materials 2 are made of a material having electrical insulating properties. As a material of the insulating plate 2, ceramics having stable physical properties and high strength such as alumina ($Al_2O_3$) or silica ($SiO_2$) are applicable. A surface plate 1 is fixed on these flat-shaped insulating materials 2. The insulating flat plate 30 is configured as divided flat plates of the insulating materials 2 so as to reduce the amount of the insulating materials 2 to be used and to facilitate the machining of the insulating materials 2. This makes it possible to manufacture the insulating flat plate 30 at a low cost.

The surface plate 1 is formed of a metallic conductor. A stainless material with high hardness and good rust resistance (for example, martensitic stainless steel) is applicable as a material of the surface plate 1. A top surface of the surface plate 1 is surfaced with highly accurate flatness, and a workpiece 12 is mounted on the top surface of the surface plate 1 to perform electrical machining. Because the workpiece 12 can be directly mounted on the surface plate 1, the mounting of the workpiece 12 is facilitated. The surface plate 1 is insulated from the surface-plate mounting table 3 by the insulating flat plate 30 at a position away from a bottom surface of the work tank 6. This prevents a breakdown of the insulation between the surface plate 1 and the surface-plate mounting table 3 due to machining chips accumulating on the bottom surface of the work tank 6. That is, the insulating materials 2 are not fixed below the surface-plate mounting table 3, but fixed between the surface-plate mounting table 3 and the surface plate 1. With this configuration, an insulation breakdown due to the accumulation of machining chips is hardly caused.

Figure 2:
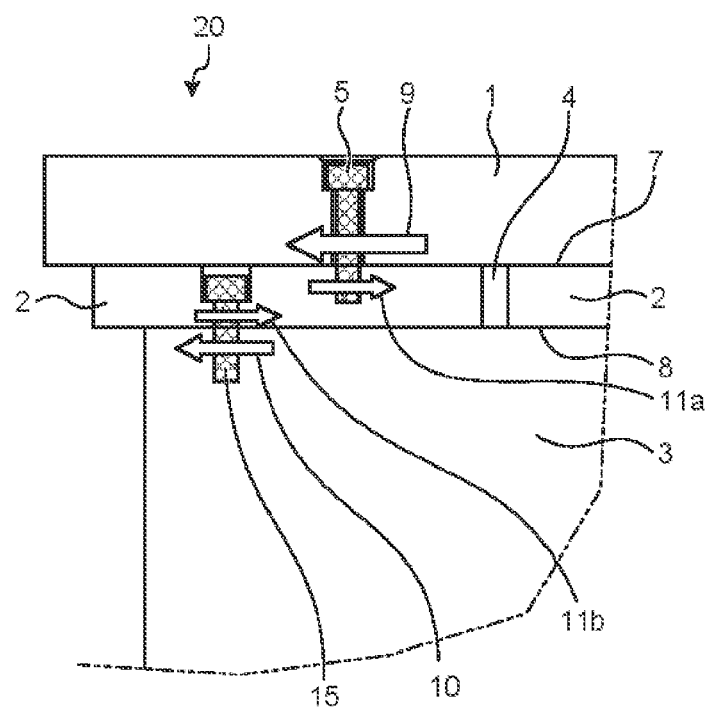
FIG. 2 is a partial cross-sectional view of a workpiece mounting table.

FIG. 2 is a partial cross-sectional view of the workpiece mounting table 20. The insulating material 2 is fixed to the surface-plate mounting table 3 with a bolt 15. The surface plate 1 is fixed to the insulating material 2 with a bolt 5. Each of the surface plate 1 and the insulating material 2 is fixed at a symmetrical position in a lateral direction of the workpiece mounting table 20. Therefore, variations in machining conditions such as a machining current caused by different mounting positions of the workpiece 12 can be decreased.

The insulating flat plate 30 formed by the insulating materials 2 is divided by the gaps 4 as shown in FIG. 1, and a shearing direction stress 9 that is generated on an interface 7 between the surface plate 1 and the insulating material 2 due to a temperature change in the surface plate 1 is made smaller than a stress caused by a friction force 11$a$ that is generated on the interface 7 between the surface plate 1 and the insulating material 2 by a fastening force of the bolt 5 fixing the surface plate 1. Furthermore, a shearing direction stress 10 that is generated on an interface 8 between the insulating material 2 and the surface-plate mounting table 3 is made smaller than a stress caused by a friction force 11$b$ that is generated on the interface 8 between the insulating material 2 and the surface-plate mounting table 3 by a fastening force of the bolt 15 fixing the insulating material 2.

Figure 3:
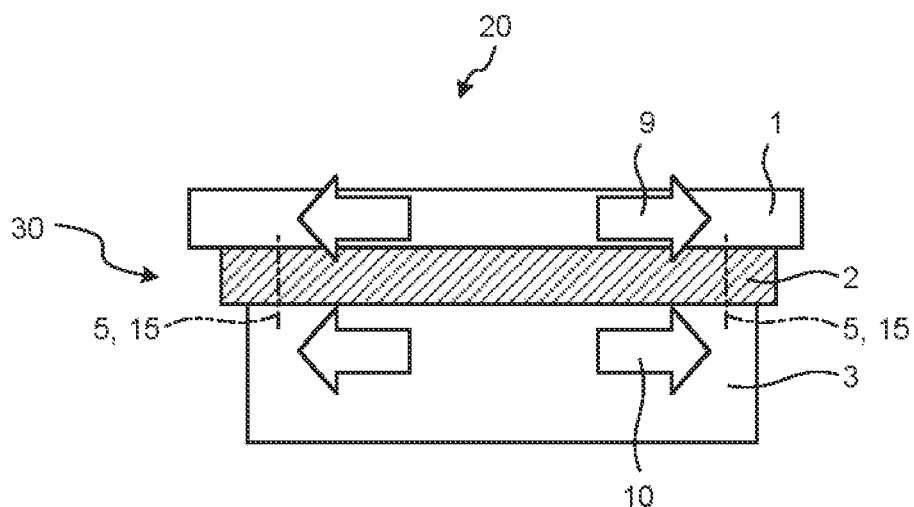
FIG. 3 schematically depicts a stress that is generated on an interface between a surface plate and an insulating material and that between the insulating material and a surface-plate mounting table when an insulating flat plate is not divided.
Figure 4:
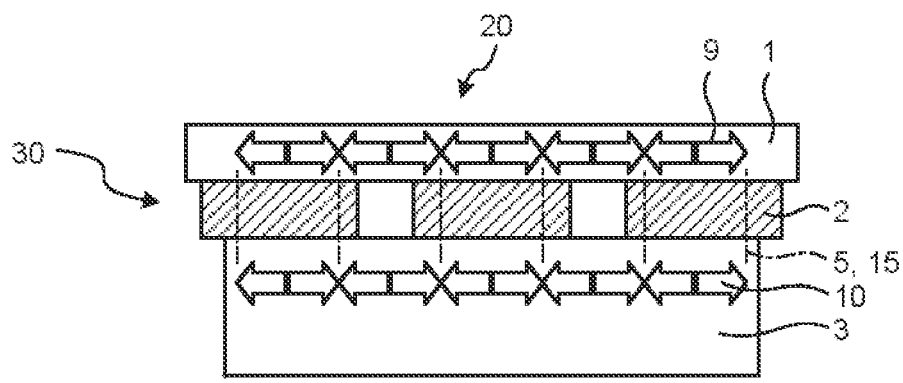
FIG. 4 schematically depicts a stress that is generated on an interface between the surface plate and the insulating material and that between the insulating material and the surface-plate mounting table when the insulating flat plate is divided.

FIG. 3 schematically depicts a stress that is generated on an interface between the surface plate 1 and the insulating material 2 and that between the insulating material 2 and the surface-plate mounting table 3 when the insulating flat plate 30 is not divided. FIG. 4 schematically depicts a stress that is generated on an interface between the surface plate 1 and the insulating material 2 and that between the insulating material 2 and the surface-plate mounting table 3 when the insulating flat plate 30 is divided. To simplify the illustrations of FIGS. 3 and 4, the arrangement position of the bolt 5 is aligned with that of the bolt 15. However, the bolt 5 and the bolt 15 can be arranged in an offset manner as shown in FIG. 2. When the insulating flat plate 30 is divided, in a portion of the insulating flat plate 30 where there is the gap 4, the insulating material 2 does not interfere with a deformation of the surface plate 1 and the surface-plate mounting table 3. Therefore, in a portion of the surface plate 1 corresponding to the gap 4 and in a portion of the surface-plate mounting table 3 corresponding to the gap 4, a stress is generated in directions toward the opposite side portions where there is the insulating material 2. This stress and another stress that is generated in a portion of the surface plate 1 corresponding to the insulating material 2 and in a portion of the surface-plate mounting table 3 corresponding to the insulating material 2 cancel each other out. Therefore, as the insulating flat plate 30 has a divided structure, the shearing direction stress 9 that is generated on the interface 7 between the surface plate 1 and the insulating material 2 due to a temperature change in a machine can be made smaller than a stress caused by the friction force 11a that is generated on the interface 7 between the surface plate 1 and the insulating material 2 by a fastening force of the bolt 5 fixing the surface plate 1. Furthermore, the shearing direction stress 10 that is generated on the interface 8 between the insulating material 2 and the surface-plate mounting table 3 can be also made smaller than a stress caused by the friction force 11b that is generated on the interface 8 between the insulating material 2 and the surface-plate mounting table 3 by a fastening force of the bolt 15 fixing the insulating material 2.

The dimensions of the gap 4 are sufficiently larger than those of particles of machining chips generated during electric discharge machining. This prevents a breakdown of the insulation between the surface plate 1 and the surface-plate mounting table 3 due to the accumulation of the machining chips in the gap 4, and also suppresses a deformation involving hysteresis due to a temperature change on the interface 7 between the surface plate 1 and the insulating material 2 and on the interface 8 between the insulating material 2 and the surface-plate mounting table 3. Therefore, the effect of preventing reduction in accuracy of the surface plate 1 can be enhanced.

In the example shown in FIG. 1, the insulating flat plate 30 is divided into four pieces. However, the division number of the insulating flat plate 30 is not limited thereto, and the number can be increased or decreased. FIG. 5 schematically depicts the shearing direction stresses 9 and 10 that are respectively generated between the surface plate 1 and the insulating material 2 and between the insulating material 2 and the surface-plate mounting table 3 due to a temperature change when the spacing of the bolts 5 fixing the surface plate 1 and the spacing of the bolts 15 fixing the insulating materials 2 are decreased. As shown in FIG. 5, when the spacing of the bolts 5 fixing the surface plate 1 is decreased to increase the number of the bolts 5, and that of the bolts 15 fixing the insulating materials 2 is decreased to increase the number of the bolts 15, the shearing direction stress 9 applied to each of the bolts 5 and the shearing direction stress 10 applied to each of the bolts 15 can be decreased. Therefore, when the division number of the insulating flat plate 30 is decreased, the number of the gaps 4 is decreased, thereby increasing the shearing direction stresses 9 and 10. This makes it necessary to increase the number of the bolts 5 and the bolts 15. On the other hand, when the division number of the insulating flat plate 30 is increased, the number of the gaps 4 is increased, thereby decreasing the shearing direction stresses 9 and 10. This makes it possible to decrease the number of the bolts 5 and the bolts 15.

As shown in FIG. 2, the workpiece mounting table 20 has a configuration in which the surface-plate mounting table 3, the insulating materials 2, and the surface plate 1 are arranged in an inversely stepped manner. In other words, the workpiece mounting table 20 has a structure in which the insulating material 2 that is located above the surface-plate mounting table 3 protrudes from the surface-plate mounting table 3, and the surface plate 1 that is located above the insulating material 2 further protrudes from the insulating material 2. With this configuration, an insulation breakdown due to the accumulation of machining chips hardly occurs. Therefore, the workpiece mounting table 20 has high durability and can be used for a long period of time.

FIG. 6 is a partial side view of the workpiece mounting table 20 that includes the surface-plate mounting table 3 in which a downwardly-recessed discharging shaped portion 13 is provided in a portion corresponding to the gap 4 on the insulating flat plate 30. As shown in FIG. 6, it is also conceivable that, in a portion of the surface-plate mounting table 3 corresponding to the gap 4, a casting is formed so as to provide the discharging shaped portion 13 having a U-shape, for example, so as to improve machining-chip discharging properties. It suffices that the discharging shaped portion 13 improves machining-chip discharging properties, and therefore the discharging shaped portion 13 can have a squared U-shape, a V-shape, or any other shape.

FIG. 7 is a partial side view of the workpiece mounting table 20 in which the gap 4 on the insulating flat plate 30 is sealed with an insulation material 14. As shown in FIG. 7, it is also possible to seal the gap 4 with the insulation material 14 of silicon or rubber such that machining chips do not enter into the gap 4 on the insulating flat plate 30.

In the above example, the surface plate 1 has an integrated shape. However, provided that variations in conditions such as a machining current are not a problem, it is obvious to be able to obtain the same effects also when the surface plate 1 is divided. In this case, as each of the surface plate 1 and the insulating material 2 is fixed at a symmetrical position in the lateral direction of the workpiece mounting table 20, variations in machining conditions such as a machining current caused by different mounting positions of the workpiece 12 can be decreased.

According to the present embodiment, even when a surface plate has an undivided integrated shape, as a structure in which divided insulating materials are interposed between the surface plate and a surface-plate mounting table is employed, it is possible to obtain an inexpensive insulating structure in which the insulating materials have the smallest flat shape as possible. It is also possible to obtain a highly-reliable insulating structure on which there is no influence of an insulation breakdown due to the accumulation of machining chips. Furthermore, despite an insulated surface-plate structure, it is possible to prevent reduction in accuracy of the surface plate due to a temperature change during machine transport and to maintain stable accuracy of the surface plate regardless of a temperature change.

INDUSTRIAL APPLICABILITY

As described above, the workpiece mounting table for an electric discharge machine according to the present invention is useful in preventing reduction in accuracy of a surface plate due to an influence of a temperature change and in reducing the machining cost of an insulating plate.

REFERENCE SIGNS LIST 1 surface plate
2 insulating material
3 surface-plate mounting table
4 gap
5, 15 bolt
6 work tank
7, 8 interface
9, 10 shearing direction stress
11a, 11b friction force
12 workpiece
13 discharging shaped portion
14 insulation material
20 workpiece mounting table
30 insulating flat plate

The invention claimed is:

1. A workpiece mounting table for an electric discharge machine that machines a workpiece by discharging electricity between an electrode and the workpiece in an interior of a work tank and removing a surface of the workpiece, the workpiece mounting table comprising:
   a surface-plate mounting table, made of an electrically conductive material, arranged at a bottom of the work tank;
   a plurality of insulating plates, made of an electrically insulating material, each of which has a flat shape and is arranged and fixed on the surface-plate mounting table with a gap between the plurality of insulating plates to constitute an electrically insulating flat plate; and
   a surface plate, made of a metal material, fixed on the electrically insulating flat plate and electrically insulated from the surface-plate mounting table by the electrically insulating flat plate, for fixing thereon the workpiece,
   wherein the surface-plate mounting table includes a downwardly-recessed discharging shaped portion at a portion corresponding to the gap between the plurality of insulating plates.

2. The workpiece mounting table for an electric discharge machine according to claim 1, wherein the surface plate, the electrically insulating flat plate, and the surface-plate mounting table are stacked in an inversely stepped manner.

3. The workpiece mounting table for an electric discharge machine according to claim 1, wherein the surface-plate mounting table is a casting, the plurality of insulating plates are ceramic plates, and the surface plate is made of stainless steel.

4. The workpiece mounting table for an electric discharge machine according to claim 1, wherein the gap is sealed with an electrically insulating material.

5. The workpiece mounting table for an electric discharge machine according to claim 1, wherein each of the electrically insulating flat plate and the surface plate is fixed laterally symmetrically with respect to a center of a top surface of the surface-plate mounting table.

6. The workpiece mounting table for an electric discharge machine according to claim 1, wherein the surface plate is divided into plural pieces.

7. A workpiece mounting table for an electric discharge machine that machines a workpiece by discharging electricity between an electrode and the workpiece in an interior of a work tank and removing a surface of the workpiece, the workpiece mounting table comprising:
   a surface-plate mounting table, made of an electrically conductive material, arranged at a bottom of the work tank;
   a plurality of insulating plates, made of an electrically insulating material, each of which has a flat shape and is arranged and fixed on the surface-plate mounting table with a gap between the plurality of insulating plates to constitute an electrically insulating flat plate; and
   a surface plate, made of a metal material, fixed on the electrically insulating flat plate and electrically insulated from the surface-plate mounting table by the electrically insulating flat plate, for fixing thereon the workpiece,
   wherein the gap is sealed with an electrically insulating material.

8. The workpiece mounting table for an electric discharge machine according to claim 7, wherein the surface-plate mounting table is a casting, the plurality of insulating plates are ceramic plates, and the surface plate is made of stainless steel.

9. The workpiece mounting table for an electric discharge machine according to claim 7, wherein the surface plate, the electrically insulating flat plate, and the surface-plate mounting table are stacked in an inversely stepped manner.

10. The workpiece mounting table for an electric discharge machine according to claim 7, wherein each of the electrically insulating flat plate and the surface plate is fixed laterally symmetrically with respect to a center of a top surface of the surface-plate mounting table.

11. The workpiece mounting table for an electric discharge machine according to claim 7, wherein the surface plate is divided into plural pieces.

* * * * *